(12) United States Patent
Terpstra et al.

(10) Patent No.: US 12,430,252 B2
(45) Date of Patent: Sep. 30, 2025

(54) DATA STORAGE IN NON-INCLUSIVE CACHE

(71) Applicant: SiFive, Inc., San Mateo, CA (US)

(72) Inventors: Wesley Waylon Terpstra, San Mateo, CA (US); Richard Van, San Jose, CA (US)

(73) Assignee: SiFive, Inc., Santa Clara, CA (US)

( * ) Notice: Subject to any disclaimer, the term of this patent is extended or adjusted under 35 U.S.C. 154(b) by 56 days.

(21) Appl. No.: 18/524,982

(22) Filed: Nov. 30, 2023

(65) Prior Publication Data
US 2024/0184697 A1 Jun. 6, 2024

Related U.S. Application Data

(60) Provisional application No. 63/429,973, filed on Dec. 2, 2022.

(51) Int. Cl.
| | |
|---|---|
| *G06F 12/0811* | (2016.01) |
| *G06F 12/0815* | (2016.01) |
| *G06F 12/0831* | (2016.01) |
| *G06F 12/0846* | (2016.01) |
| *G06F 12/121* | (2016.01) |

(52) U.S. Cl.
CPC ...... *G06F 12/0811* (2013.01); *G06F 12/0815* (2013.01); *G06F 12/0833* (2013.01); *G06F 12/0846* (2013.01); *G06F 12/121* (2013.01)

(58) Field of Classification Search
None
See application file for complete search history.

(56) References Cited

U.S. PATENT DOCUMENTS

| | | | |
|---|---|---|---|
| 2016/0085677 A1* | 3/2016 | Loh | G06F 12/0864 711/143 |
| 2018/0173640 A1* | 6/2018 | Jiang | G06F 12/0895 |
| 2019/0155731 A1* | 5/2019 | Hagersten | G06F 12/0864 |
| 2019/0188142 A1* | 6/2019 | Rappoport | G06F 9/3017 |
| 2023/0236972 A1* | 7/2023 | Reed | G06F 12/0813 711/118 |

* cited by examiner

*Primary Examiner* — Kaushikkumar M Patel
(74) *Attorney, Agent, or Firm* — Kilpatrick Townsend & Stockton LLP

(57) ABSTRACT

Systems and methods for data storage in a non-inclusive cache. An integrated circuit includes a cache that includes a databank with multiple entries configured to store respective cache lines and an array of cache tags. Each cache tag includes a data pointer that points to an entry in the databank. A method includes allocating the entry in the databank to the cache including the array of cache tags from amongst multiple caches in the integrated circuit by writing the data pointer to the cache tag in the array of cache tags.

18 Claims, 10 Drawing Sheets

DATA STORAGE IN NON-INCLUSIVE CACHE

CROSS-REFERENCE TO RELATED APPLICATION(S)

This application claims priority to and the benefit of U.S. Provisional Patent Application Ser. No. 63/429,973, filed Dec. 2, 2022, the entire disclosure of which is hereby incorporated by reference.

TECHNICAL FIELD

This disclosure relates to data storage in a non-inclusive cache.

BACKGROUND

Multi-level caches can be designed in various ways depending on whether the content of one cache is present in other levels of caches. If all blocks in the higher level cache are also present in the lower level cache, then the lower level cache is said to be inclusive of the higher level cache. If the lower level cache contains only blocks that are not present in the higher level cache, then the lower level cache is said to be exclusive of the higher level cache.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Disclosed herein are implementations of data storage in a non-inclusive cache. Some implementations may efficiently manage data storage in a non-inclusive cache using a dataPointer, which is stored in a tag of the cache.

For example, Chip-Multiprocessor (CMP) architectures usually have multi-level cache hierarchies. A processor core may contain L1 Data Cache and private or shared L2 Cache. The next level is L3 cache. For L3 cache, there are many choices for inclusion policy, such as, inclusive, exclusive, or non-inclusive. Each inclusion policy has different pros and cons. An inclusion policy may be chosen based on system requirements. An inclusive cache can effectively handle snoop filtering but suffers from high space usage, since it needs to duplicate data of the lower cache. Some implementations described herein include an extensible Cache (XC), which addresses the reduced space issue of the inclusive cache while maintaining support for snoop filtering. Some implementations include a Non-Inclusive Cache Inclusive Directory (NICID) architecture for an Extensible Cache.

As used herein, the term "circuitry" refers to an arrangement of electronic components (e.g., transistors, resistors, capacitors, and/or inductors) that is structured to implement one or more functions. For example, a circuitry may include one or more transistors interconnected to form logic gates that collectively implement a logical function.

Figure 1:
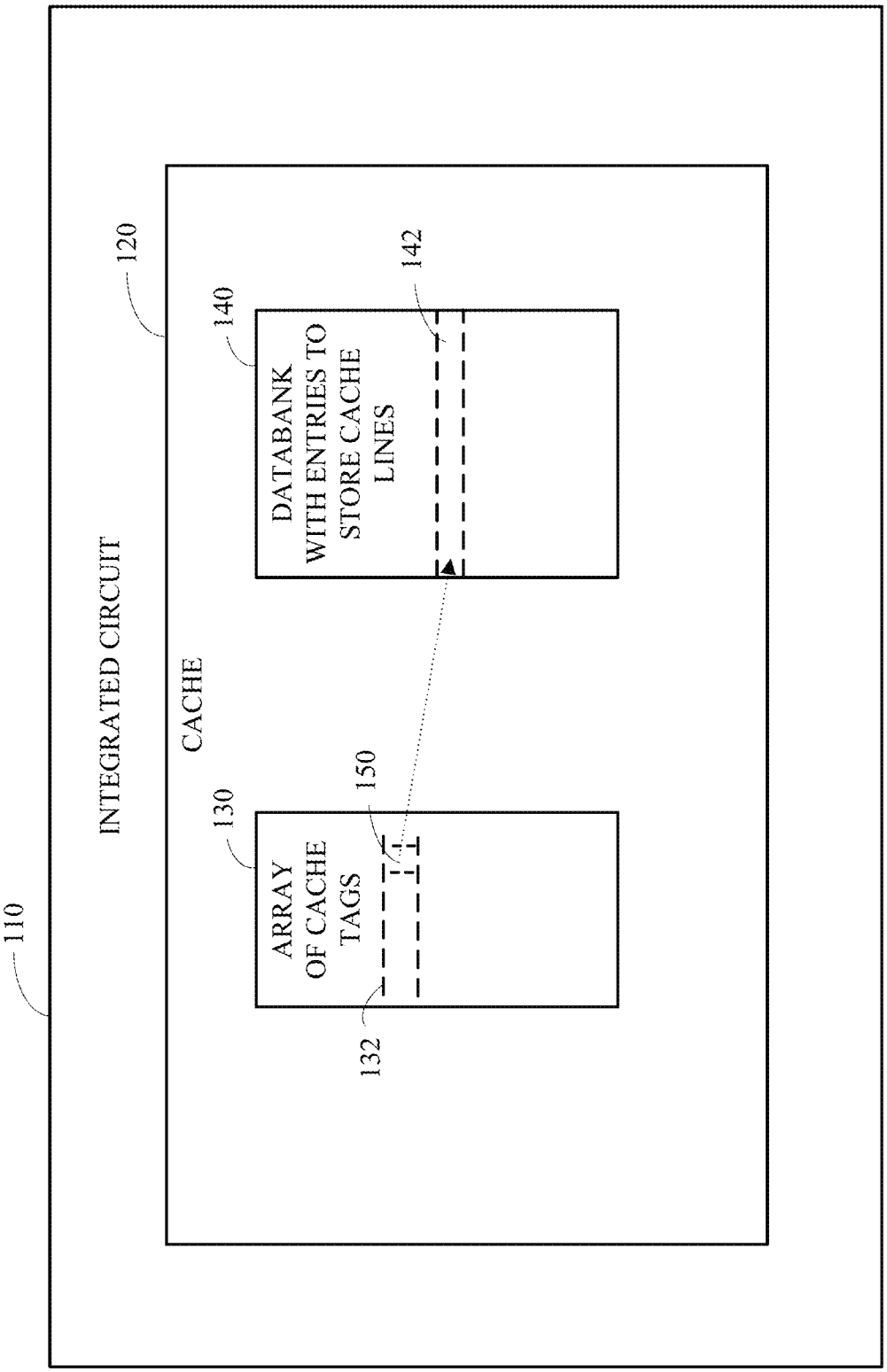
FIG. 1 is a block diagram of an example of an integrated circuit for data storage in an extensible cache.

FIG. 1 is a block diagram of an example of an integrated circuit 110 for data storage in an extensible cache. The integrated circuit 110 (e.g., a system on a chip (SOC)) includes a cache 120. The cache 120 includes a databank 140 with multiple entries (see, e.g., entry 142) configured to store respective cache lines; and an array 130 of cache tags (see, e.g., cache tag 132), wherein each cache tag includes a data pointer (see, e.g., data pointer 150) that points to an entry (e.g., the entry 142) in the databank 140. In some implementations, the databank 140 is one of multiple databanks and a cache tag stored in the array 130 includes a bank identifier and an index for an entry in a databank corresponding to the bank identifier. For example, the cache 120 may include the non-inclusive cache inclusive directory 300 of FIG. 3.

Decoupling a tag from the memory used to store its associated tag line using a data pointer (e.g., the data pointer 150) may enable the re-association of data to a physical address without the need to copy the data from temporary storage. It may also simplify the implementation of a non-inclusive cache, where data buffers are only associated to those addresses for which retaining a copy of the data improves performance. For example, the cache 120 may be configurable to vary in size (e.g., from 4 megabytes to 32 megabytes). For example, the cache 120 may be non-inclusive. In some implementations, the cache 120 may be physically indexed physically tagged (PIPT). In some implementations, the array 130 of cache tags may be organized into one or more ways. For example, the cache 120 may be 16-way set associative. An entry in the databank 140 may be configured to store a cache line of data. For example, a cache line size of the cache 120 may be 64 bytes. In some implementations, the cache 120 includes a directory cache to handle snoop filtering. For example, the array 130 of cache tags may include static random access memory (SRAM) or flops for storing cache tags.

The cache 120 may support different cache replacement policies, such as, re-reference interval prediction (RRIP), pseudo-least recently used (pLRU), or random. For example, the cache 120 may support a modified owned exclusive shared invalid (MOESI) cache coherency protocol. In some implementations, the cache 120 supports butterfly network on a chip (NOC) topology. For example, the cache 120 may be configured to support error detect and reporting for reliability availability serviceability (RAS). In some implementations, the cache 120 includes performance monitors.

In some implementations, the databank 140 is one of multiple databanks and a cache tag stored in the array 130 includes a valid bit indicating whether the cache tag points to an entry in the databank that is currently storing valid data corresponding to the cache tag. In some implementations, a cache tag stored in the array 130 includes an inner cache status field, which indicates whether an inner cache is currently storing a copy of the data associated with the cache tag. In some implementations, a cache tag stored in the array 130 includes an outer cache status field, which indicates whether an outer cache is currently storing a copy of the data associated with the cache tag. For example, the cache tag 132 and/or other cache tags of the array 130 may be in the format described for cache tags of the non-inclusive cache inclusive directory 300 of FIG. 3. In some implementations, the cache 120 may be a non-inclusive cache. In some implementations, the cache 120 may be an L2 cache that is private to one processor core. For example, the cache 120 may be the private L2 cache 610 of FIG. 6A. In some implementations, the cache 120 may be an L2 cache that is shared by multiple processor cores. For example, the cache 120 may be the shared L2 cache 630 of FIG. 6B. In some implementations, the cache 120 may be an L3 cache that is shared by multiple processor cores. For example, the cache 120 may be the shared L3 cache 670 of FIG. 6C.

Figure 2:
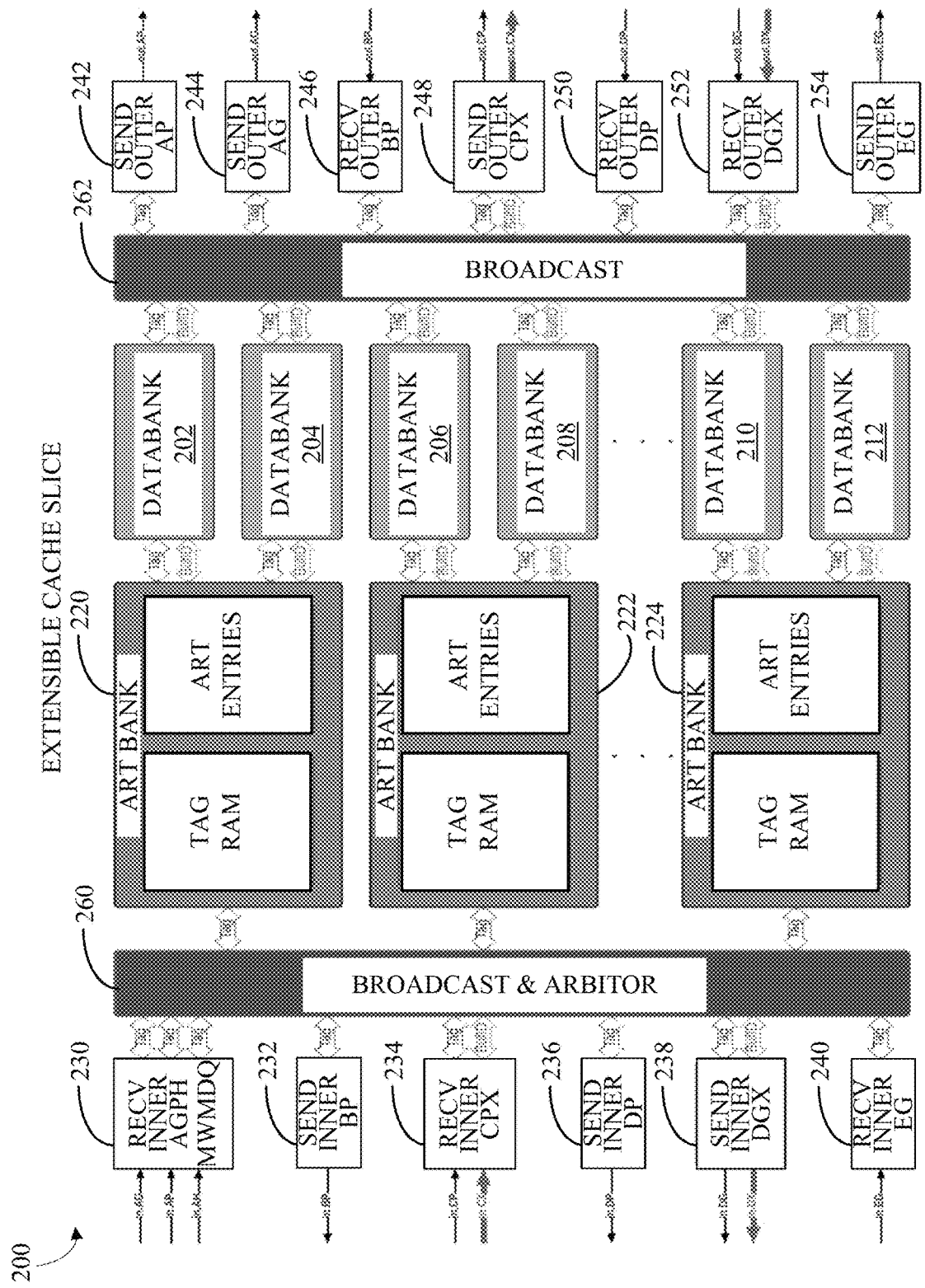
FIG. 2 is a block diagram of an example of a microarchitecture for an integrated circuit using an extensible cache.

FIG. 2 is a block diagram of an example of a microarchitecture 200 for an integrated circuit using an extensible cache (e.g., the cache 120). The microarchitecture 200 may implement an extensible cache slice. The microarchitecture 200 includes a set of databanks, including a databank 202 (e.g., the databank 140), a databank 204, a databank 206, a databank 208, a databank 210, and a databank 212, that are configured to store cache lines of data. The microarchitecture 200 includes a set of active request table (ART) banks, including an ART bank 220, an ART bank 222, and an ART bank 224, that are configured to process cache requests to and from inner and outer agents in a cache hierarchy. The ART bank 220, the ART bank 222, and the ART bank 224 each include tag random access memory (RAM) and a set of ART entries for keeping track of individual transactions. The microarchitecture 200 includes a set of inner and outer agents implementing a cache hierarchy, including a receive inner AGPH agent 230, a send inner BP agent 232, a receive inner CPX agent 234, a send inner DP agent 236, a send inner DGX agent 238, a receive inner EG agent 240, a send outer AP agent 242, a send outer AG agent 244, a receive outer BP agent 246, a send outer CPX agent 248, a receive outer DP agent 250, a receive outer DGX agent 252, and a send outer EG agent 254. The inner agents (230, 232, 234, 236, 238, and 240) access the ART banks (220, 222, and 224) and/or the databanks (202, 204, 206, 208, 210, and 212) via a broadcast & arbiter fabric 260. The outer agents (242, 244, 246, 248, 250, 252, and 254) access the ART banks (220, 222, and 224) and/or the databanks (202, 204, 206, 208, 210, and 212) via a broadcast fabric 262. The agents (230, 232, 234, 236, 238, 240, 242, 244, 246, 248, 250, 252, and 254) may access cache data using tags and/or buffer identifiers, including a bank identifier and an index for an entry in a databank corresponding to the bank identifier (e.g., as described in relation to FIG. 3).

Figure 3:
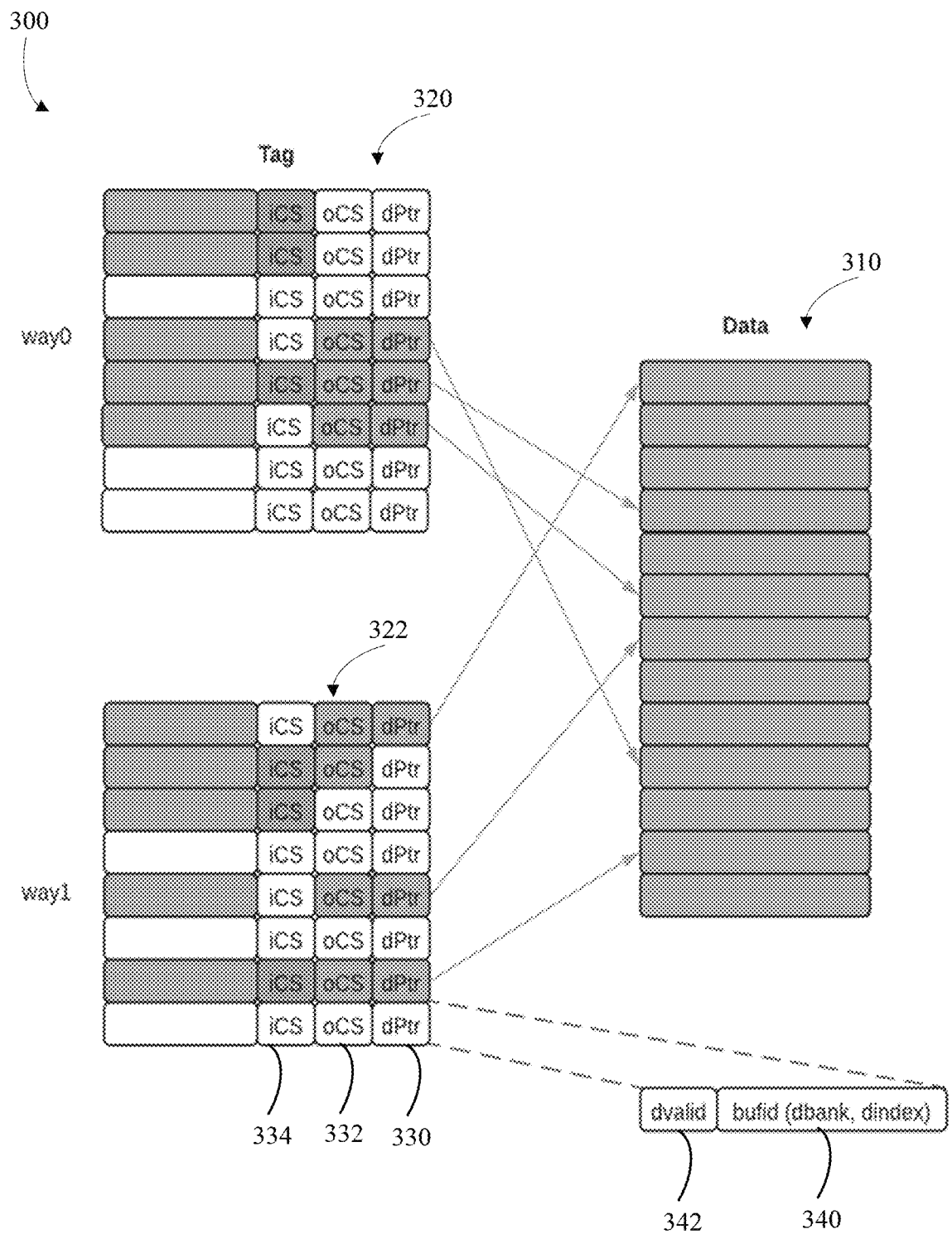
FIG. 3 is a block diagram of an example of a non-inclusive cache inclusive directory.

FIG. 3 is a block diagram of an example of a non-inclusive cache inclusive directory 300. The non-inclusive cache inclusive directory 300 includes a databank 310 with multiple entries configured to respectively store cache lines of data. The non-inclusive cache inclusive directory 300 includes a first array 320 of cache tags for a first way and a second array 322 of cache tags for a second way. A tag stored in the first array 320 of cache tags or the second array 322 of cache tags may include a data pointer 330 that points to an entry in the databank 310 that stores a cache line of data associated with the tag; an outer cache status field 332, which indicates whether an outer cache is currently storing a copy of the data associated with the cache tag; and an inner cache status field 334, which indicates whether an inner cache is currently storing a copy of the data associated with the cache tag. In some implementations, the data pointer 330 includes a buffer identifier 340, including a bank identifier and an index for an entry in a databank (e.g., one of multiple databanks, including the databank 310) corresponding to the bank identifier. In some implementations, the data pointer 330 includes a valid bit 342 indicating whether the cache tag points to an entry in the databank 310 that is currently storing valid data corresponding to the cache tag.

The non-inclusive cache inclusive directory 300 may be part of a non-inclusive/exclusive cache. In some implementations, the non-inclusive cache inclusive directory 300 may increase total cache capacity. In some implementations, the non-inclusive cache inclusive directory 300 may cause address space suffering due to duplicate data of a lower cache. In some implementations, the non-inclusive cache inclusive directory 300 may be inclusive and may maintain support for snoop filtering. In some implementations, the non-inclusive cache inclusive directory 300 may also be configured the support an inclusive cache for a shared L2 cache design.

Figure 4:
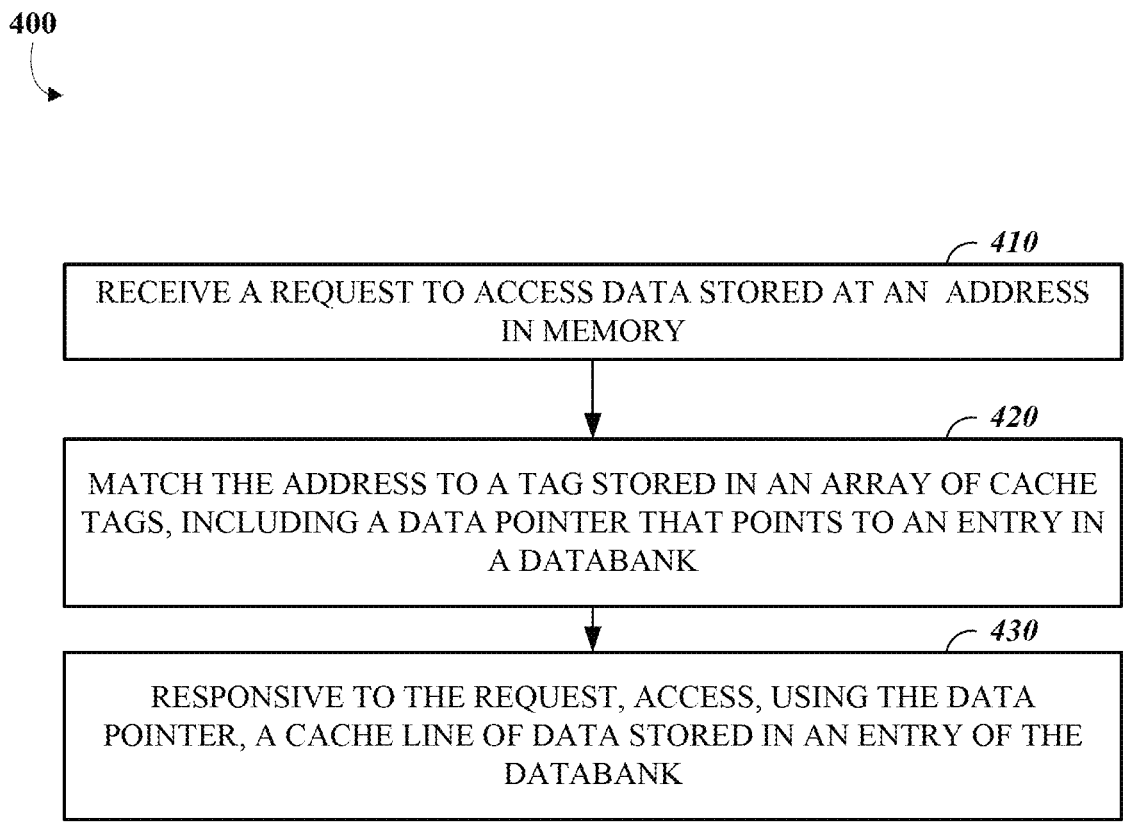
FIG. 4 is a flow chart of an example of a technique for accessing cached data in an extensible cache.

FIG. 4 is a flow chart of an example of a technique 400 for accessing cached data in an extensible cache. The technique 400 includes receiving 410 a request to access data stored at an address in memory; matching 420 the address to a tag stored in an array of cache tags, wherein the cache tag includes a data pointer that points to an entry in a databank; and, responsive to the request, accessing 430, using the data pointer, a cache line of data stored in an entry of the databank. For example, the technique 400 may be implemented using the integrated circuit 110 of FIG. 1.

The technique 400 includes receiving 410 a request to access data stored at an address in memory (e.g., random access memory (RAM)). For example, the address may be a physical address that can be used directly to access memory. In some implementations, the address may be a virtual address that must be translated to a physical address in order to access memory using the address.

The technique 400 includes matching the address to a tag stored in an array of cache tags (e.g., the array 130 of cache tags). The cache tag includes a data pointer (e.g., the data pointer 150) that points to an entry (e.g., the entry 142) in a databank (e.g., the databank 140). For example, the databank may be one of multiple databanks and a cache tag stored in the array may include a bank identifier and an index for an entry in a databank corresponding to the bank identifier (e.g., as described in relation to FIG. 3). For example, the databank may be one of multiple databanks and a cache tag stored in the array may include a valid bit (e.g., the valid bit 342) indicating whether the cache tag points to an entry in the databank that is currently storing valid data corresponding to the cache tag. For example, a cache tag stored in the array may include an inner cache status field (e.g., the inner cache status field 334) and an outer cache status field (e.g., the outer cache status field 332). In some implementations, entries in the databank may be reassigned (e.g., by an execution pipeline including an active request table (ART)) to different tags in the array of cache tags to facilitate cache transactions. For example, the technique 500 of FIG. 5 may be used to reassign a different entry in the databank to the tag in the array of cache tags.

The technique 400 includes, responsive to the request, accessing 430, using the data pointer, a cache line of data stored in an entry of the databank. For example, accessing 430 the cache line of data may include reading the cache line of data from the entry in the databank. For example, accessing 430 the cache line of data may include writing a new cache line of data to the entry in the databank to initiate an update to a corresponding memory location in accordance with a cache coherency protocol.

Figure 5:
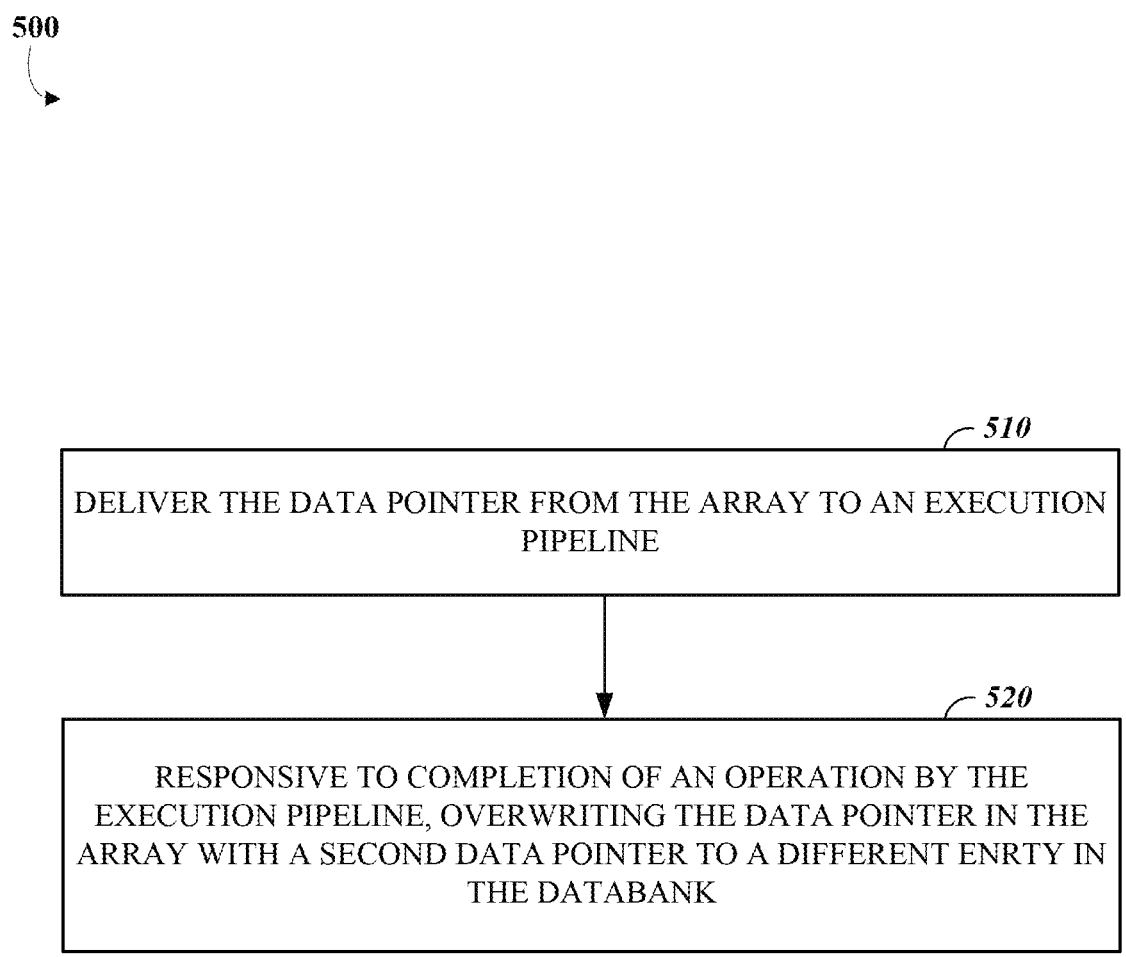
FIG. 5 is a flow chart of an example of a technique for dynamically reassigning databank entries to cache tags.

FIG. 5 is a flow chart of an example of a technique 500 for dynamically reassigning databank entries to cache tags. The technique 500 includes delivering 510 the data pointer from the array to an execution pipeline; and, responsive to completion of an operation by the execution pipeline, overwriting 520 the data pointer in the array with a second data pointer to a different entry in the databank. For example, the technique 500 may be implemented using the integrated circuit 110 of FIG. 1.

The technique 500 includes delivering 510 the data pointer from the array to an execution pipeline. For example, the execution pipeline may be part of the cache 120. For example, the execution pipeline may be part of the microarchitecture 200. For example, the execution pipeline may include an active request table (ART) and the data pointer may be copied into an entry in the ART.

The technique 500 includes, responsive to completion of an operation by the execution pipeline, overwriting 520 the data pointer in the array with a second data pointer to a different entry in the databank. For example, overwriting 520 the data pointer in the array with the second data pointer may serve to reassign an entry in the databank to a different tag in the array if cache tags. In some implementations, overwriting 520 the data pointer in the array with the second data pointer may facilitate efficient completion of cache transactions (e.g., via zero-cycle moves of cache lines of data).

Figure 6A:
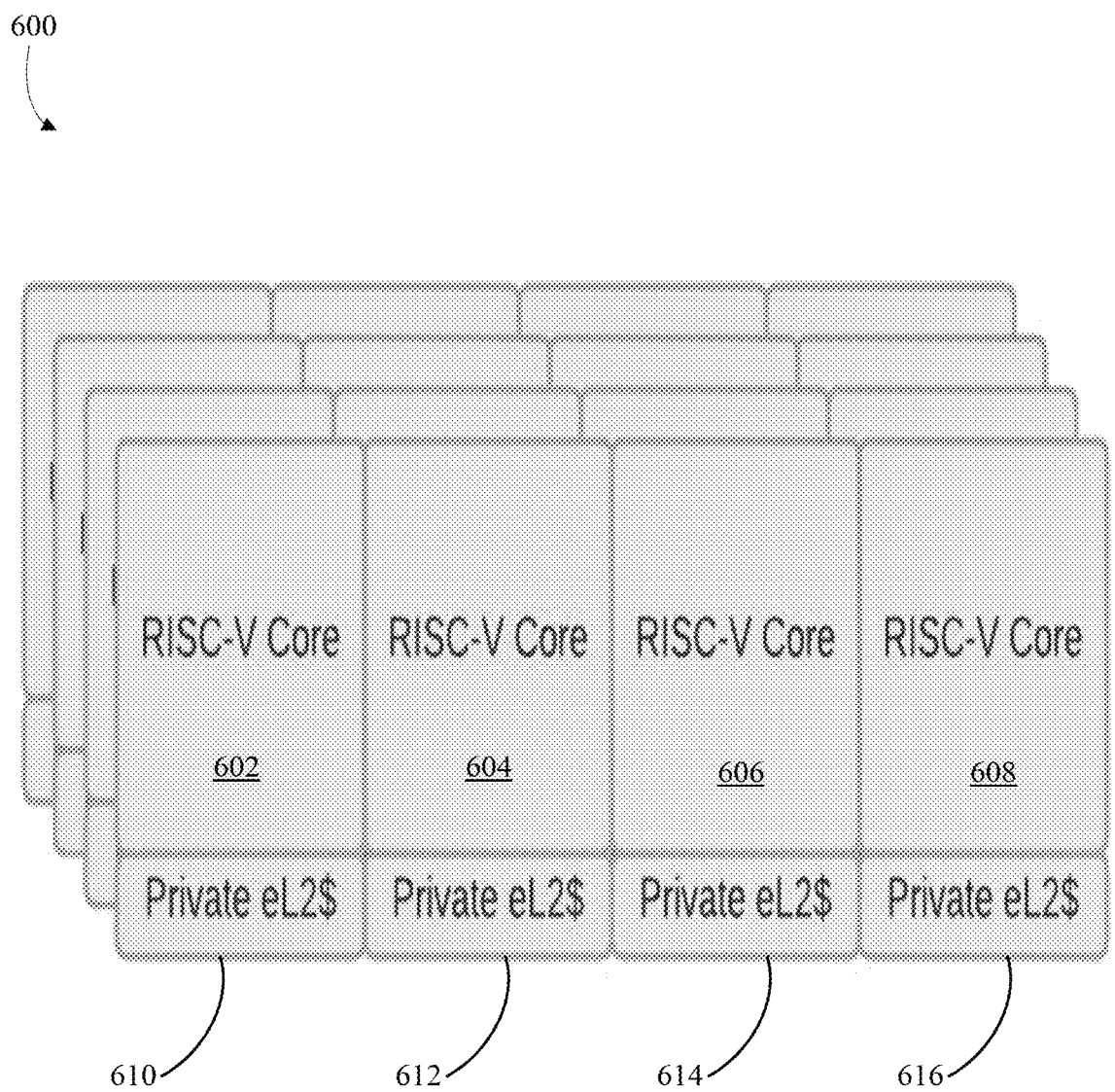
FIG. 6A is a block diagram of an example of a system including an extensible cache used as a private L2 cache.

FIG. 6A is a block diagram of an example of a system 600 including an extensible cache 610 used as a private L2 cache. The system 600 includes multiple processor cores, including a processor core 602, a processor core 604, a processor core 606, and a processor core 608 (e.g., RISC-V processor cores). The system 600 includes extensible caches that serve as private L2 caches for the processor cores. The system 600 includes an extensible cache 610 (e.g., the cache 120) that is configured to serve as a private L2 cache for the processor core 602. The system 600 includes an extensible cache 612 (e.g., the cache 120) that is configured to serve as a private L2 cache for the processor core 604. The system 600 includes an extensible cache 614 (e.g., the cache 120) that is configured to serve as a private L2 cache for the processor core 606. The system 600 includes an extensible cache 616 (e.g., the cache 120) that is configured to serve as a private L2 cache for the processor core 608. The extensible cache 610, the extensible cache 612, the extensible cache 614, and the extensible cache 616 may share access to one more databanks (e.g., the databank 140) to enable dynamic allocation of cache line entries amongst these processor cores (e.g., to better support differing workloads distributed across the respective processor cores (602, 604, 606, and 608)).

Figure 6B:
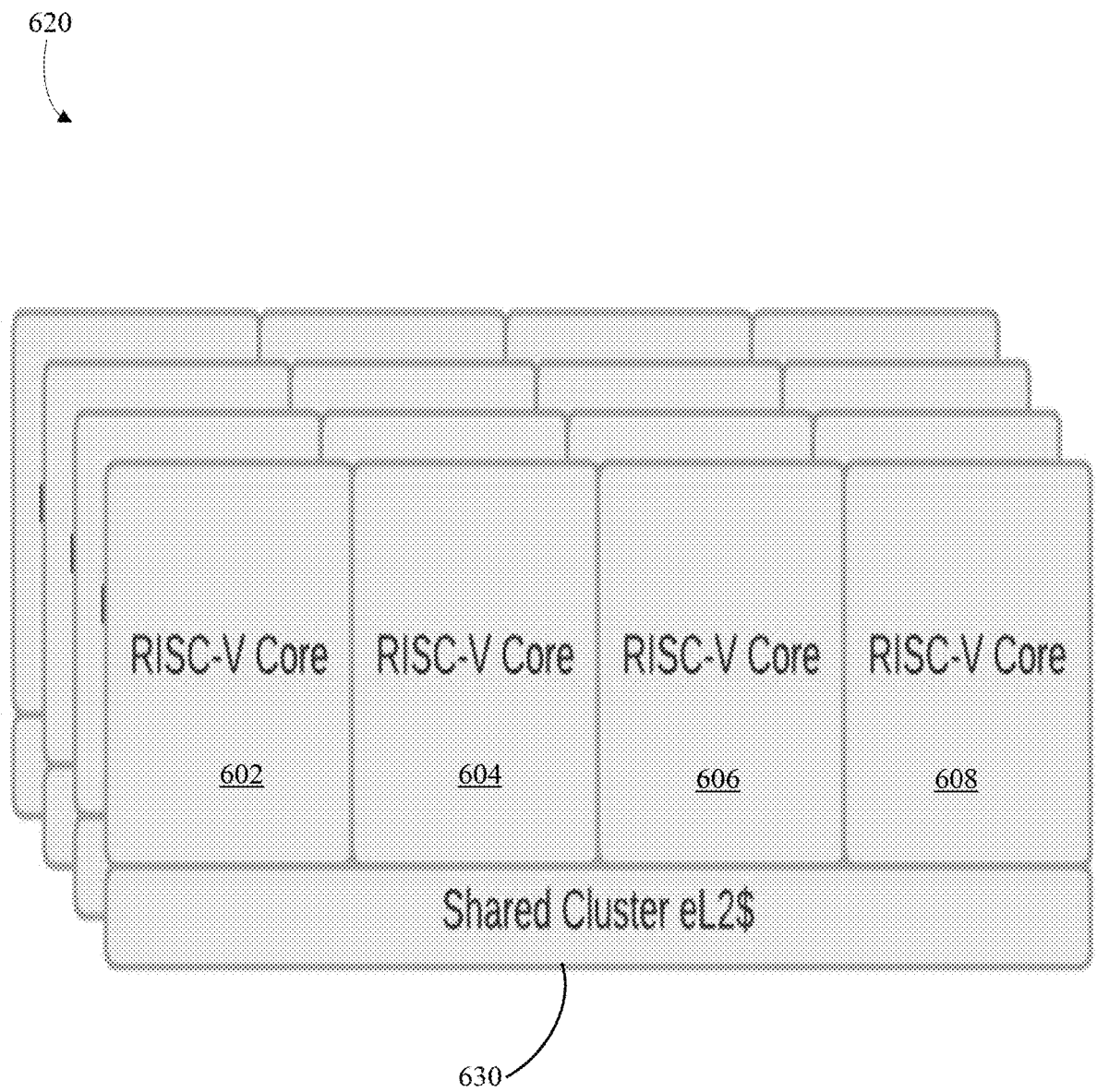
FIG. 6B is a block diagram of an example of a system including an extensible cache used as a shared L2 cache.

FIG. 6B is a block diagram of an example of a system 620 including an extensible cache 630 used as a shared L2 cache. The system 620 includes multiple processor cores arranged in clusters, including the processor core 602, the processor core 604, the processor core 606, and the processor core 608 (e.g., RISC-V processor cores). The system 620 includes extensible caches that serve as shared cluster L2 caches for processor cores of the system 620. The system 620 includes an extensible cache 630 (e.g., the cache 120) that is configured to serve as a shared cluster L2 cache for a cluster including the processor core 602, the processor core 604, the processor core 606, and the processor core 608. The extensible cache 630 may share access to one more databanks (e.g., the databank 140) with other cluster level caches to enable dynamic allocation of cache line entries amongst these processor core clusters (e.g., to better support differing workloads distributed across the respective clusters.

Figure 6C:
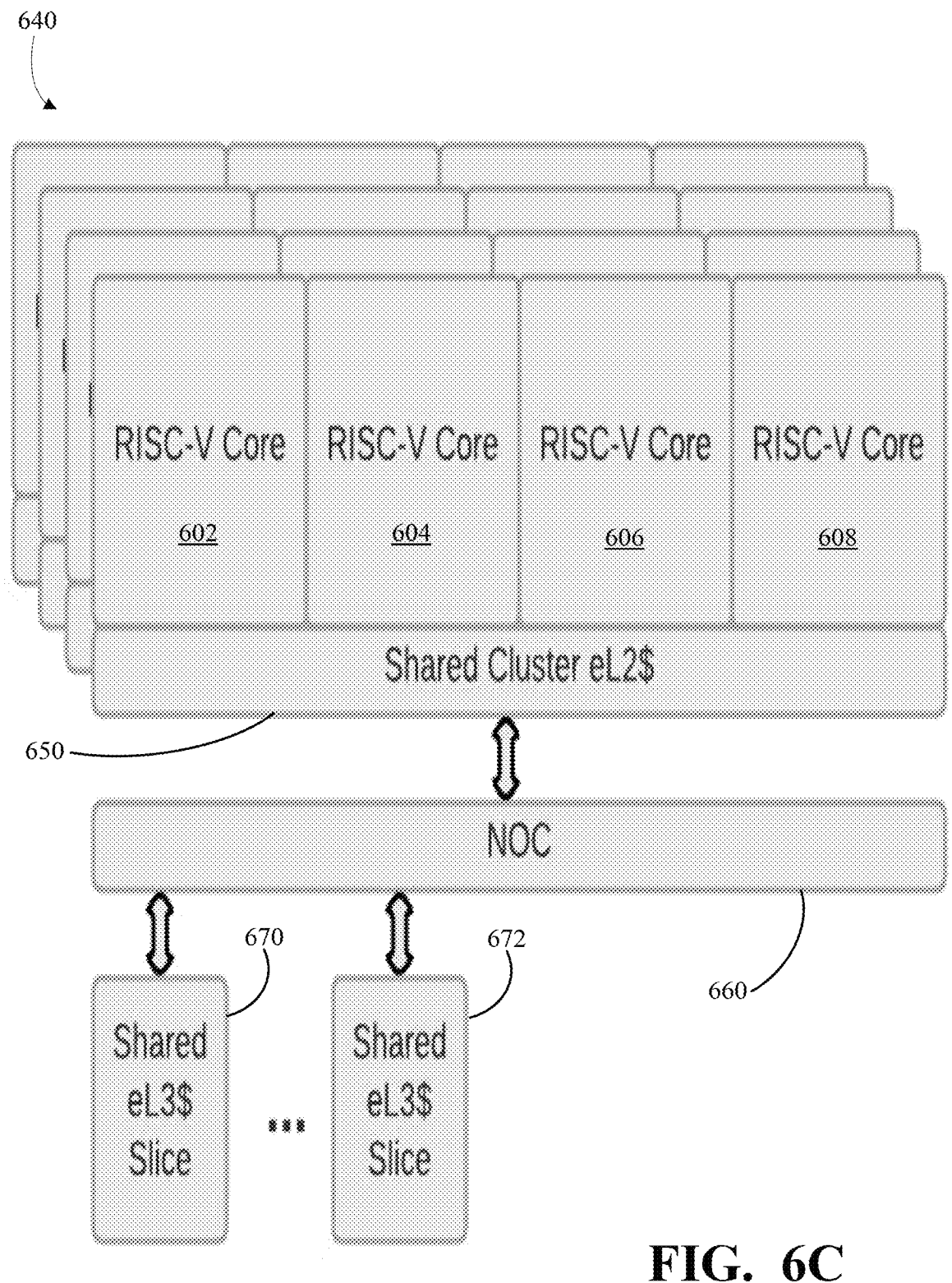
FIG. 6C is a block diagram of an example of a system including an extensible cache used as a shared L3 cache.

FIG. 6C is a block diagram of an example of a system 640 including an extensible cache 670 used as a shared L3 cache. The system 640 includes multiple processor cores arranged in clusters, including the processor core 602, the processor core 604, the processor core 606, and the processor core 608 (e.g., RISC-V processor cores). The system 640 includes extensible caches that serve as shared cluster L2 caches for processor cores of the system 640. The system 640 includes an extensible cache 650 (e.g., the cache 120) that is configured to serve as a shared cluster L2 cache for a cluster including the processor core 602, the processor core 604, the processor core 606, and the processor core 608. The system 640 includes extensible caches that serve as shared L3 caches for multiple clusters of processor cores of the system 640. The system 640 includes a network on a chip (NOC) 660 for facilitating communication between clusters of processor cores and other components of an SOC (e.g., the integrated circuit 110). The system 640 includes an extensible cache 670 (e.g., the cache 120) that is configured to serve as a shared L3 cache for multiple clusters of processors cores of the system 640. A shared L3 cache may be arranged in multiple slices including extensible cache 670 and the extensible cache 672. The extensible cache 670 and the extensible cache 672 are outside of extensible cache 650 in a cache hierarchy and may support a cache coherency protocol (e.g., MOESI) with the extensible cache 650 and other shared cluster L2 caches of the system 640. The extensible cache 670 and the extensible cache 672 may conduct cache transactions with the extensible cache 650 and other shared cluster L2 caches of the system 640 via the NOC 660.

Figure 7:
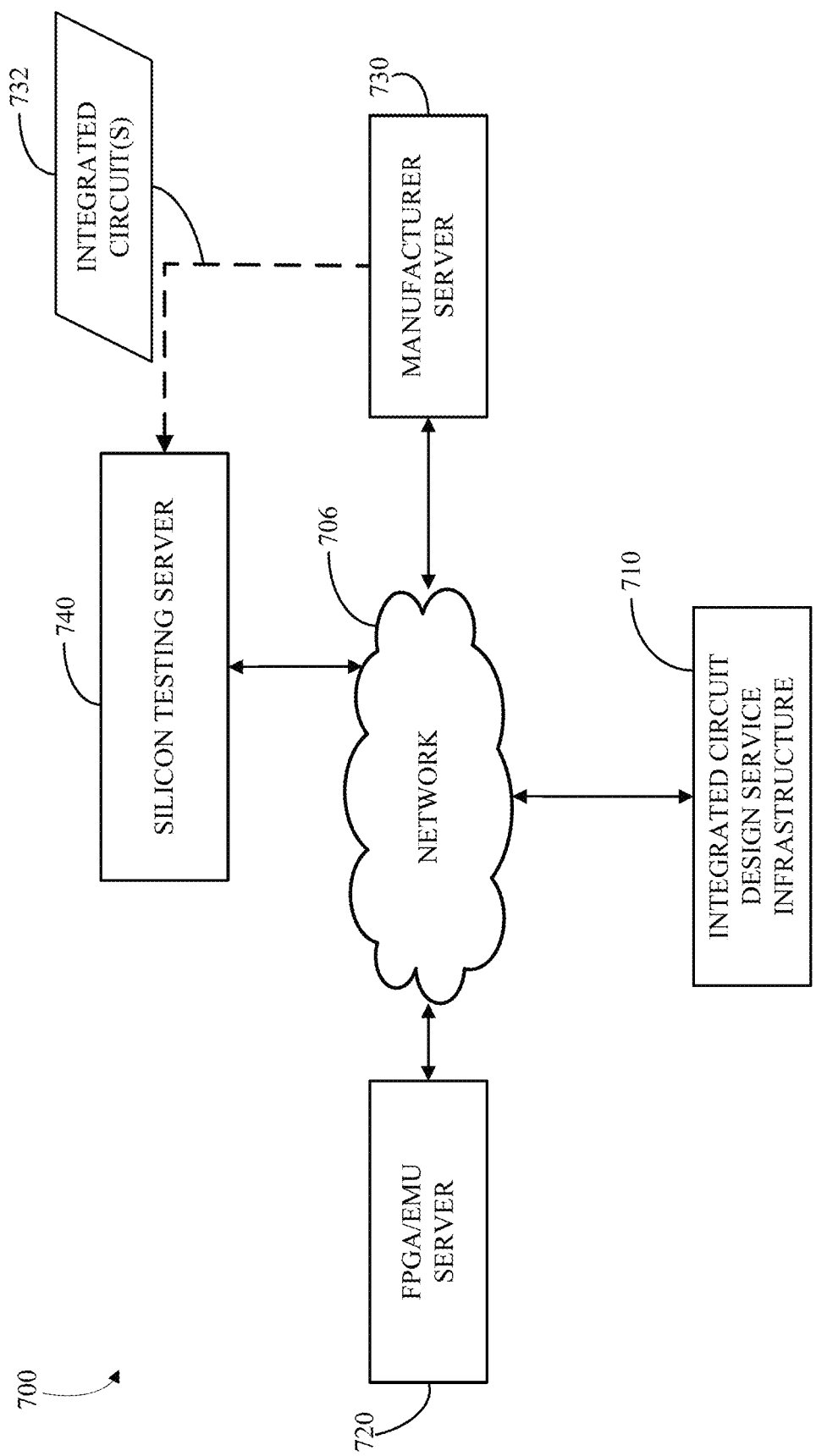
FIG. 7 is a block diagram of an example of a system for facilitating generation and manufacture of integrated circuits.

FIG. 7 is a block diagram of an example of a system 700 for generation and manufacture of integrated circuits. The system 700 includes a network 706, an integrated circuit design service infrastructure 710, a field programmable gate array (FPGA)/emulator server 720, and a manufacturer server 730. For example, a user may utilize a web client or a scripting API client to command the integrated circuit design service infrastructure 710 to automatically generate an integrated circuit design based a set of design parameter values selected by the user for one or more template integrated circuit designs. In some implementations, the integrated circuit design service infrastructure 710 may be configured to generate an integrated circuit design that includes the circuitry shown and described in FIG. 1.

The integrated circuit design service infrastructure 710 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high-level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 710 may invoke (e.g., via network communications over the network 706) testing of the resulting design that is performed by the FPGA/emulation server 720 that is running one or more FPGAs or other types of hardware or software emulators. For example, the integrated circuit design service infrastructure 710 may invoke a test using a field programmable gate array, programmed based on a field programmable gate array emulation data structure, to obtain an emulation result. The field programmable gate array may be operating on the FPGA/emulation server 720, which may be a cloud server. Test results may be returned by the FPGA/emulation server 720 to the integrated circuit design service infrastructure 710 and relayed in a useful format to the user (e.g., via a web client or a scripting API client).

The integrated circuit design service infrastructure 710 may also facilitate the manufacture of integrated circuits using the integrated circuit design in a manufacturing facility associated with the manufacturer server 730. In some implementations, a physical design specification (e.g., a graphic data system (GDS) file, such as a GDS II file) based on a physical design data structure for the integrated circuit is transmitted to the manufacturer server 730 to invoke manufacturing of the integrated circuit (e.g., using manufacturing equipment of the associated manufacturer). For example, the manufacturer server 730 may host a foundry tape out website that is configured to receive physical design specifications (e.g., as a GDSII file or an OASIS file) to schedule or otherwise facilitate fabrication of integrated circuits. In some implementations, the integrated circuit design service infrastructure 710 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 710 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 730 may fabricate and/or test integrated circuits based on the integrated circuit design. For example, the associated manufacturer (e.g., a foundry) may perform optical proximity correction (OPC) and similar post-tapeout/pre-production processing, fabricate the integrated circuit(s) 732, update the integrated circuit design service infrastructure 710 (e.g., via communications with a controller or a web application server) periodically or asynchronously on the status of the manufacturing process, perform appropriate testing (e.g., wafer testing), and send to packaging house for packaging. A packaging house may receive the finished wafers or dice from the manufacturer and test materials and update the integrated circuit design service infrastructure 710 on the status of the packaging and delivery process periodically or asynchronously. In some implementations, status updates may be relayed to the user when the user checks in using the web interface and/or the controller might email the user that updates are available.

In some implementations, the resulting integrated circuits 732 (e.g., physical chips) are delivered (e.g., via mail) to a silicon testing service provider associated with a silicon testing server 740. In some implementations, the resulting integrated circuits 732 (e.g., physical chips) are installed in a system controlled by silicon testing server 740 (e.g., a cloud server) making them quickly accessible to be run and tested remotely using network communications to control the operation of the integrated circuits 732. For example, a login to the silicon testing server 740 controlling a manufactured integrated circuits 732 may be sent to the integrated circuit design service infrastructure 710 and relayed to a user (e.g., via a web client). For example, the integrated circuit design service infrastructure 710 may control testing of one or more integrated circuits 732, which may be structured based on an RTL data structure.

Figure 8:
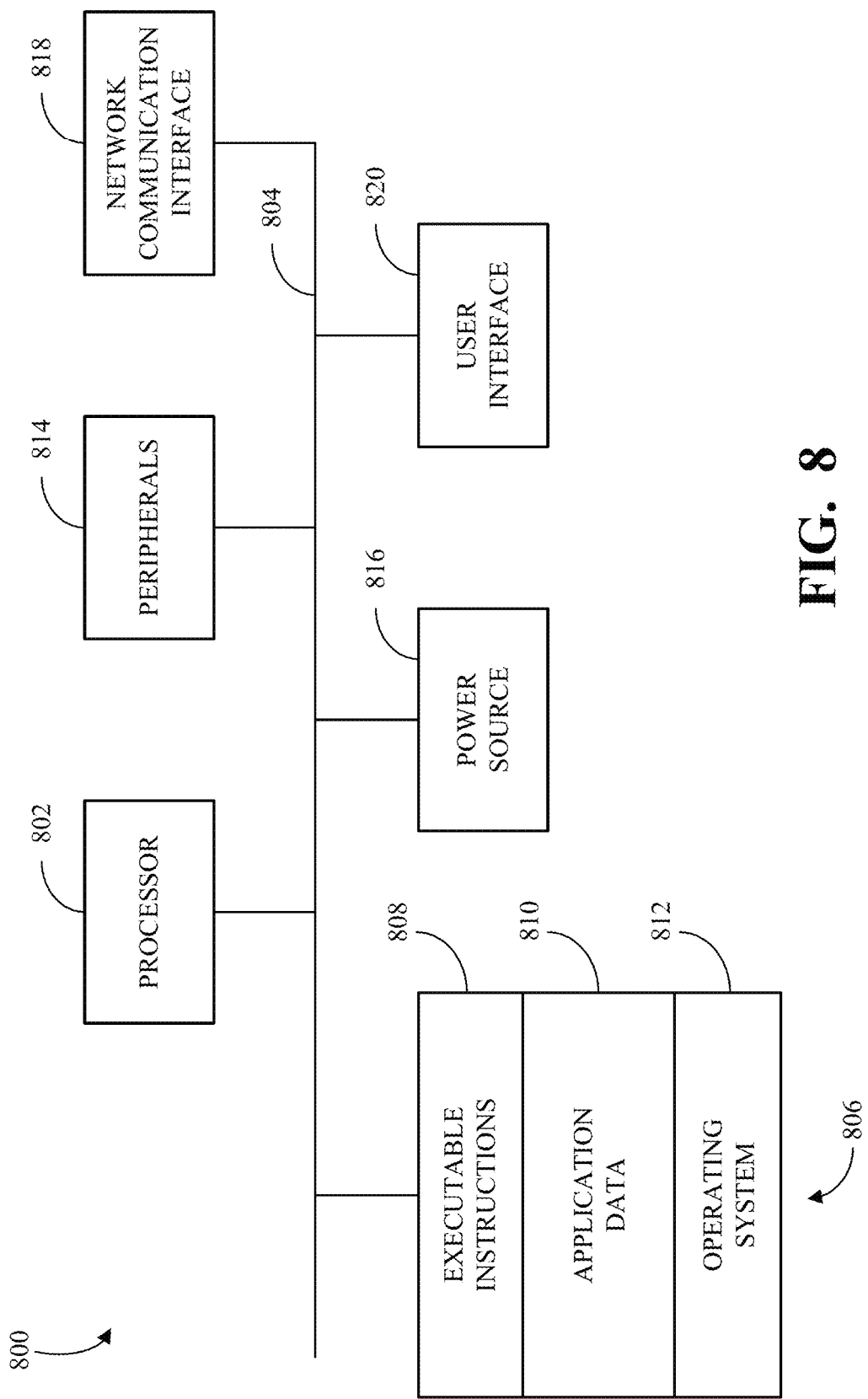
FIG. 8 is a block diagram of an example of a system for facilitating generation of integrated circuits.

FIG. 8 is a block diagram of an example of a system 800 for facilitating generation of integrated circuits, for facilitating generation of a circuit representation for an integrated circuit, and/or for programming or manufacturing an integrated circuit. The system 800 is an example of an internal configuration of a computing device. The system 800 may be used to implement the integrated circuit design service infrastructure 710, and/or to generate a file that generates a circuit representation of an integrated circuit design including the circuitry shown and described in FIG. 1. The system 800 can include components or units, such as a processor 802, a bus 804, a memory 806, peripherals 814, a power source 816, a network communication interface 818, a user interface 820, other suitable components, or a combination thereof.

The processor 802 can be a central processing unit (CPU), such as a microprocessor, and can include single or multiple processors having single or multiple processing cores. Alternatively, the processor 802 can include another type of device, or multiple devices, now existing or hereafter developed, capable of manipulating or processing information. For example, the processor 802 can include multiple processors interconnected in any manner, including hardwired or networked, including wirelessly networked. In some implementations, the operations of the processor 802 can be distributed across multiple physical devices or units that can be coupled directly or across a local area or other suitable type of network. In some implementations, the processor 802 can include a cache, or cache memory, for local storage of operating data or instructions.

The memory 806 can include volatile memory, non-volatile memory, or a combination thereof. For example, the memory 806 can include volatile memory, such as one or more DRAM modules such as double data rate (DDR) synchronous dynamic random access memory (SDRAM), and non-volatile memory, such as a disk drive, a solid state drive, flash memory, Phase-Change Memory (PCM), or any form of non-volatile memory capable of persistent electronic information storage, such as in the absence of an active power supply. The memory 806 can include another type of device, or multiple devices, now existing or hereafter developed, capable of storing data or instructions for processing by the processor 802. The processor 802 can access or manipulate data in the memory 806 via the bus 804. Although shown as a single block in FIG. 8, the memory 806 can be implemented as multiple units. For example, a system 800 can include volatile memory, such as RAM, and persistent memory, such as a hard drive or other storage.

The memory 806 can include executable instructions 808, data, such as application data 810, an operating system 812, or a combination thereof, for immediate access by the processor 802. The executable instructions 808 can include, for example, one or more application programs, which can be loaded or copied, in whole or in part, from non-volatile memory to volatile memory to be executed by the processor 802. The executable instructions 808 can be organized into programmable modules or algorithms, functional programs, codes, code segments, or combinations thereof to perform various functions described herein. For example, the executable instructions 808 can include instructions executable by the processor 802 to cause the system 800 to automatically, in response to a command, generate an integrated circuit design and associated test results based on a design parameters data structure. The application data 810 can include, for example, user files, database catalogs or dictionaries, configuration information or functional programs, such as a web browser, a web server, a database server, or a combination thereof. The operating system 812 can be, for example, Microsoft Windows®, macOS®, or Linux®; an operating system for a small device, such as a smartphone or tablet device; or an operating system for a large device, such as a mainframe computer. The memory 806 can comprise one or more devices and can utilize one or more types of storage, such as solid state or magnetic storage.

The peripherals 814 can be coupled to the processor 802 via the bus 804. The peripherals 814 can be sensors or detectors, or devices containing any number of sensors or detectors, which can monitor the system 800 itself or the environment around the system 800. For example, a system 800 can contain a temperature sensor for measuring temperatures of components of the system 800, such as the processor 802. Other sensors or detectors can be used with the system 800, as can be contemplated. In some implementations, the power source 816 can be a battery, and the system 800 can operate independently of an external power distribution system. Any of the components of the system 800, such as the peripherals 814 or the power source 816, can communicate with the processor 802 via the bus 804.

The network communication interface 818 can also be coupled to the processor 802 via the bus 804. In some implementations, the network communication interface 818 can comprise one or more transceivers. The network communication interface 818 can, for example, provide a connection or link to a network, such as the network 706 shown in FIG. 7, via a network interface, which can be a wired network interface, such as Ethernet, or a wireless network interface. For example, the system 800 can communicate with other devices via the network communication interface 818 and the network interface using one or more network protocols, such as Ethernet, transmission control protocol (TCP), Internet protocol (IP), power line communication (PLC), wireless fidelity (Wi-Fi), infrared, general packet radio service (GPRS), global system for mobile communications (GSM), code division multiple access (CDMA), or other suitable protocols.

A user interface 820 can include a display; a positional input device, such as a mouse, touchpad, touchscreen, or the like; a keyboard; or other suitable human or machine interface devices. The user interface 820 can be coupled to the processor 802 via the bus 804. Other interface devices that permit a user to program or otherwise use the system 800 can be provided in addition to or as an alternative to a display. In some implementations, the user interface 820 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 814. The operations of the processor 802 can be distributed across multiple clients or servers, which can be coupled directly or across a local area or other suitable type of network. The memory 806 can be distributed across multiple clients or servers, such as network-based memory or memory in multiple clients or servers performing the operations of clients or servers. Although depicted here as a single bus, the bus 804 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

In a first aspect, the subject matter described in this specification can be embodied in integrated circuits that include a cache, including, a databank with multiple entries configured to store respective cache lines; and an array of cache tags, wherein each cache tag includes a data pointer that points to an entry in the databank.

In the first aspect, the databank may be one of multiple databanks and a cache tag stored in the array may include a bank identifier and an index for an entry in a databank corresponding to the bank identifier. In the first aspect, the databank may be one of multiple databanks and a cache tag stored in the array may include a valid bit indicating whether the cache tag points to an entry in the databank that is currently storing valid data corresponding to the cache tag. In the first aspect, a cache tag stored in the array may include an inner cache status field. In the first aspect, a cache tag stored in the array may include an outer cache status field. In the first aspect, the cache may be a non-inclusive cache. In the first aspect, the cache may be an L2 cache that is private to one processor core. In the first aspect, the cache may be an L2 cache that is shared by multiple processor cores. In the first aspect, the cache may be an L3 cache that is shared by multiple processor cores.

In a second aspect, the subject matter described in this specification can be embodied in methods that include receiving a request to access data stored at an address in memory; matching the address to a tag stored in an array of cache tags, wherein the cache tag includes a data pointer that points to an entry in a databank; and, responsive to the request, accessing, using the data pointer, a cache line of data stored in an entry of the databank.

In the second aspect, the methods may include allocating the entry in the databank to a cache including the array of cache tags from amongst multiple caches in an integrated circuit by writing the data pointer to the cache tag in the array of cache tags. In the second aspect, the databank may be one of multiple databanks and a cache tag stored in the array may include a bank identifier and an index for an entry in a databank corresponding to the bank identifier. In the second aspect, the databank may be one of multiple databanks and a cache tag stored in the array may include a valid bit indicating whether the cache tag points to an entry in the databank that is currently storing valid data corresponding to the cache tag. In the second aspect, a cache tag stored in the array may include an inner cache status field. In the second aspect, a cache tag stored in the array may include an outer cache status field. In the second aspect, the cache may be a non-inclusive cache. In the second aspect, the cache may be an L2 cache that is private to one processor core. In the second aspect, the cache may be an L2 cache that is shared by multiple processor cores. In the second aspect, the cache may be an L3 cache that is shared by multiple processor cores.

In a third aspect, the subject matter described in this specification can be embodied in a non-transitory computer readable medium comprising a circuit representation that, when processed by a computer, is used to program or manufacture an integrated circuit including a cache including: a databank with multiple entries configured to store respective cache lines; and an array of cache tags, wherein each cache tag includes a data pointer that points to an entry in the databank.

In the third aspect, the databank may be one of multiple databanks and a cache tag stored in the array may include a bank identifier and an index for an entry in a databank corresponding to the bank identifier. In the third aspect, the databank may be one of multiple databanks and a cache tag stored in the array may include a valid bit indicating whether the cache tag points to an entry in the databank that is currently storing valid data corresponding to the cache tag. In the third aspect, a cache tag stored in the array may include an inner cache status field. In the third aspect, a cache tag stored in the array may include an outer cache status field. In the third aspect, the cache may be a non-inclusive cache. In the third aspect, the cache may be an L2 cache that is private to one processor core. In the third aspect, the cache may be an L2 cache that is shared by multiple processor cores. In the third aspect, the cache may be an L3 cache that is shared by multiple processor cores.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An integrated circuit comprising:
   a cache comprising:
      a databank with multiple entries configured to store respective cache lines; and
      an array of cache tags, wherein each cache tag includes a data pointer and an outer cache status field, wherein the data pointer points to an entry in the databank and the outer cache status field indicates whether an outer cache is currently storing a copy of the data of the entry in the databank.

2. The integrated circuit of claim 1, in which the databank is one of multiple databanks and a cache tag stored in the array includes a bank identifier and an index for an entry in a databank corresponding to the bank identifier.

3. The integrated circuit of claim 1, in which the databank is one of multiple databanks and a cache tag stored in the array includes a valid bit indicating whether the cache tag points to an entry in the databank that is currently storing valid data corresponding to the cache tag.

4. The integrated circuit of claim 1, in which a cache tag stored in the array includes an inner cache status field that indicates whether an inner cache is currently storing a copy of the data of the entry in the databank.

5. The integrated circuit of claim 1, in which the cache is a non-inclusive cache.

6. The integrated circuit of claim 1, in which the cache is an L2 cache that is private to one processor core.

7. The integrated circuit of claim 1, in which the cache is an L2 cache that is shared by multiple processor cores.

8. The integrated circuit of claim 1, in which the cache is an L3 cache that is shared by multiple processor cores.

9. A non-transitory computer readable medium comprising a circuit representation that, when processed by a computer, is used to program or manufacture an integrated circuit comprising:
   a cache comprising:
      a databank with multiple entries configured to store respective cache lines; and
      an array of cache tags, wherein each cache tag includes a data pointer and an outer cache status field, wherein the data pointer points to an entry in the databank and the outer cache status field indicates whether an outer cache is currently storing a copy of the data of the entry in the databank.

10. The non-transitory computer readable medium of claim 9, in which the databank is one of multiple databanks and a cache tag stored in the array includes a bank identifier and an index for an entry in a databank corresponding to the bank identifier.

11. The non-transitory computer readable medium of claim 9, in which the databank is one of multiple databanks and a cache tag stored in the array includes a valid bit indicating whether the cache tag points to an entry in the databank that is currently storing valid data corresponding to the cache tag.

12. The non-transitory computer readable medium of claim 9, in which a cache tag stored in the array includes an inner cache status field that indicates whether an inner cache is currently storing a copy of the data of the entry in the databank.

13. The non-transitory computer readable medium of claim 9, in which the cache is a non-inclusive cache.

14. A method comprising:
receiving a request to access data stored at an address in memory;
matching the address to a tag stored in an array of cache tags, wherein the cache tag includes a data pointer and an outer cache status field, wherein the data pointer points to an entry in a databank and the outer cache status field indicates whether an outer cache is currently storing a copy of the data of the entry in the databank; and
responsive to the request, accessing, using the data pointer, a cache line of data stored in an entry of the databank.

15. The method of claim 14, comprising:
delivering the data pointer from the array to an execution pipeline; and
responsive to completion of an operation by the execution pipeline, overwriting the data pointer in the array with a second data pointer to a different entry in the databank.

16. The method of claim 14, in which the databank is one of multiple databanks and a cache tag stored in the array includes a bank identifier and an index for an entry in a databank corresponding to the bank identifier.

17. The method of claim 14, in which the databank is one of multiple databanks and a cache tag stored in the array includes a valid bit indicating whether the cache tag points to an entry in the databank that is currently storing valid data corresponding to the cache tag.

18. The method of claim 14, in which a cache tag stored in the array includes an inner cache status field that indicates whether an inner cache is currently storing a copy of the data of the entry in the databank.

* * * * *